United States Patent [19]

Kollmeier et al.

[11] Patent Number: 4,692,292

[45] Date of Patent: Sep. 8, 1987

[54] PROCESS FOR THE MANUFACTURE OF MOLDED OBJECTS

[75] Inventors: Hans-Joachim Kollmeier, Essen; Helmut Lammerting, Herbede, both of Fed. Rep. of Germany

[73] Assignee: Th. Goldschmidt AG, Essen, Fed. Rep. of Germany

[21] Appl. No.: 813,667

[22] Filed: Dec. 26, 1985

[30] Foreign Application Priority Data

Jun. 25, 1985 [DE] Fed. Rep. of Germany ....... 3522659

[51] Int. Cl.$^4$ .................. B27J 5/00; B29C 33/64; B29C 43/00
[52] U.S. Cl. .................. 264/126; 264/122; 264/300; 264/338; 528/18; 528/33
[58] Field of Search ............ 264/109, 122, 300, 338, 264/126; 427/133, 135; 528/18, 33

[56] References Cited

U.S. PATENT DOCUMENTS

| | | | |
|---|---|---|---|
| 3,565,838 | 2/1971 | Atkinson et al. | 528/18 |
| 3,941,856 | 3/1976 | Creasey et al. | 528/18 X |
| 4,033,912 | 7/1977 | Kleimann et al. | 264/338 X |
| 4,110,397 | 8/1978 | Wooler | 264/338 |
| 4,498,929 | 2/1985 | Robertson | 264/338 X |
| 4,504,313 | 3/1985 | Robertson | 264/338 X |
| 4,528,154 | 7/1985 | Nguyen et al. | 264/109 |
| 4,534,928 | 8/1985 | Martin | 264/338 X |
| 4,546,154 | 10/1985 | Robertson | 264/338 X |

FOREIGN PATENT DOCUMENTS 2081637 2/1982 United Kingdom ............ 264/300

Primary Examiner—Jeffery Thurlow
Assistant Examiner—Leo B. Tentoni
Attorney, Agent, or Firm—Toren, McGeady & Associates

[57] ABSTRACT

Process for manufacturing of molded objects by hot-pressing lignocellulose-containing materials with polyisocyanates as binders while using an agent to release the molded article from the surface of the metal press used. A mixture of the organosilicon compounds is applied onto the surface of the cauls or molds which faces the material to be pressed, and cured at a temperature from 100° to 200° C., preferably in the presence of known curing catalysts. The mixture of organosilicon compounds comprising (a) 20 to 65 weight percent of a silicone resin of the general formula

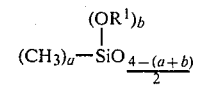

in which
R$^1$ is a low molecular weight alkyl radical with 1 to 4 carbon atoms,
a has a value of 1 to 1.7,
b has a value of 0.3 to 1.0;

(b) 30 to 65 weight percent of an α,ω-methylsiloxanediol with an average molecular weight of 1,000 to 20,000;

(c) 5 to 15 weight percent of a silicate ester of the general formula

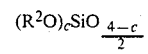

in which
R$^2$ is a low molecular weight hydrocarbon radical with 2 to 4 carbon atoms,
c has a value of 2.1 to 4.0;

wherein the sum of components (a), (b) and (c) amounts to 100. The release properties can be further improved if more closely defined polysiloxane block copolymers are used as internal release agents.

13 Claims, No Drawings

PROCESS FOR THE MANUFACTURE OF MOLDED OBJECTS

SUMMARY OF THE INVENTION

1. Field of the Invention

The invention relates to a process for the manufacture of molded objects by hot-pressing lignocellulose-containing materials using polyisocyanates as binders and an agent to release the molded article from the surface of the metal press used.

2. Description of the Prior Art

In the manufacture of lignocellulose-containing materials, bonded exclusively with polyisocyanates, such as, for example, chipboards, particle boards, fiber boards, plywood or cork panels, objects molded from flax, straw or other cellulose-containing materials, release agents are indispensable for releasing the molded object from the caul or the mold.

German Auslegeschrift No. 11 31 873 discloses the use of polyols or primary amines as release agents. However, the polyisocyanates used to form the lignocellulose-containing materials react with these compounds. As a result, reaction products are formed at the surface of the molded object, which can interfere with the further processing of the molded objects, i.e., gluing, coating or lacquering.

German Patent No. 23 25 926 discloses a compound for use as release agent in amounts of 0.1 to 50 weight percent, based on the polyisocyanate, which catalyzes isocyanurate formation in the presence of isocyanate groups. Examples of such compounds are phenol Mannich bases, derivatives of hexahydrotriazine, alkali salts of carboxylic acids, and strong bases or compounds of the guanidine type. The compounds are sprayed onto the surface of the article to be presed, on the press surface or into the mold. However, these compounds when used as release agents, have the disadvantage that they must be reapplied before each molding operation. Thus, they do not produce a permanent coating. Moreover, the compounds used in accordance with this patent take portions of the polyisocyanate required for the bonding away from the surface of the molded object.

German Patent No. 31 11 562 discloses a process for producing polyisocyanate-bonded hardboards or chipboards, wherein special phosphate esters, such as, for example, octyl dilauryl phosphate, are used as internal release agents.

SUMMARY OF THE INVENTION

We have discovered a release agent which, when applied on the side of the cauls or the molds facing the material to be pressed, is effective during several pressing processes and therefore, does not have to be reapplied for each pressing. More particularly, this is achieved by applying onto the surface of the caul or the mold which faces the material to be pressed, a mixture of organosilicon compounds and curing at temperatures from 100° to 200° C., preferably in the presence of known curing catalysts. The mixture of organosilicon compounds comprises:

(a) 20 to 65 weight percent of a silicon resin of the general formula

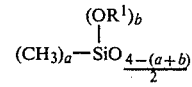

in which
R$^1$ is a low molecular weight alkyl radical with 1 to 4 carbon atoms,
a has a value of 1 to 1.7,
b has a value of 0.3 to 1.0;

(b) 30 to 65 weight percent of an α,ω-methylsiloxanediol with an average molecular weight of 1,000 to 20,000;

(c) 5 to 15 weight percent of an optionally polymeric silicate ester of the general formula

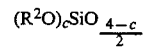

in which
R$^2$ is a low molecular weight hydrocarbon radical with 2 to 4 carbon atoms,
c has a value of 2.1 to 4.0;
wherein the sum of components (a), (b) and (c) amounts to 100.

DESCRIPTION OF THE PREFERRED EMBODIMENTS

Component (a) is a curable methylalkoxysiloxane, which is obtainable in a known manner by reacting the appropriate methylchlorosilane with the alcohol R$^1$OH. The R$^1$ radical preferably is an ethyl radical. However, it may be a methyl radical or an optionally branched propyl or butyl radical.

Subscript "a" has a value of 1 to 1.7 and, preferably, a value to 1 to 1.5. The value of subscript "b" is 0.3 to 1.0 and, preferably, 0.5 to 0.8.

Component (b) is a polydimethylsiloxane which has terminal hydroxyl groups linked to silicon atoms. The average molecular weight of this methylsiloxanediol should fall within the range of 1,000 to 20,000. A range of 3,000 to 10,000 and, especially, a range of 4,000 to 8,000 is preferred.

Component (c) is a silicate ester which, optionally, may be present as a polymer. If the silicate ester is present as a monomer, subscript "c" has a value of 4. The value of the subscript "c" decreases with an increasing degree of polymerization. Therefore, subscript "c" has a value of 2.1 to 4.0 in the silicate esters used according to the present invention.

The R$^2$ radical preferably is the ethyl radical. However, it may also be the linear or branched propyl or butyl radical.

The coating on the caul is formed in a simple manner by dissolving the mixture of components (a) to (c) in a solvent or solvent mixture. As solvents, chlorinated hydrocarbons are particularly suitable. Examples of suitable solvents are 1,1,1-trichloroethane, perchloroethylene, monofluorotrichloromethane, methylene chloride, solvent naphtha or toluene. Slight amounts of a curing catalyst, for example, p-toluene-sulfonic acid, are added to the solution. Other suitable catalysts are organotin compounds, such as, dibutyl tin diacetate or dibutyl tin dilaurate. Several formulations for the solutions of coating agents are as follows:

| Components | Formulation | | | | |
|---|---|---|---|---|---|
| (weight percent) | 1 | 2 | 3 | 4 | 5 |
| alkoxypolysiloxane (a) | 4.7 | 6.0 | 4.0 | 4.7 | 6.0 |
| α, ω-siloxanediol (b) | 4.3 | 3.0 | 5.5 | 4.3 | 3.0 |
| silicate ester (c) | 1.0 | 1.0 | 0.5 | 1.0 | 1.0 |
| p-toluenesulfonic acid | 0.2 | 0.2 | 0.2 | — | — |
| dibutyl tin diacetate | — | — | — | 0.2 | 0.18 |
| solvent naphtha, B.P. range 140–190° C. | 10.0 | 10.0 | 10.0 | 10.0 | 10.0 |
| solvent naphtha, B.P. range 80–110° C. | 5.0 | 5.0 | 5.0 | 5.0 | 5.0 |
| 1,1,1-trichloroethane | 10.0 | 10.0 | 10.0 | 10.0 | 10.0 |
| monofluorotrichloromethane | 63.0 | 63.0 | 63.0 | 63.3 | 63.0 |

The caul is sprayed with the solution of the coating agent until a coherent, thin film is formed. The caul is then heated to a temperature of 100° to 200° C. Normally, this does not require a separate heating step; rather, the caul takes on this temperature in the hot press, the organosilicon compounds (a) to (c) reacting with each other within a few seconds and curing to a solid film, which has the required elasticity and does not precipitate any components which would impede the later processing of the panels of the material, especially the gluing on of films or veneers, the lacquering or coating.

The caul so coated satisfactorily releases the molded objects formed by the pressing operation for several pressing cycles. After 5 to 8 pressing cycles, the caul can be sprayed again with the solution of the coating agent, it being unnecessary to take the caul from the press for this purpose.

It has been found that the release action can be increased considerably if, in addition, certain internal release agents are added to the materials to be pressed. Moreover, a synergistic effect arises from the combined action of the coating agent on the caul or mold and the internal release agent. The number of pressing cycles with good release action increases considerably above the number, which can be achieved with either the coating agent or the internal release agent by itself.

An additional aspect of the invention is the use of an internal release agent which is admixed before the pressing step with the lignocellulose-containing materials in amounts of 1 to 5 weight percent, based on the polyisocyanate.

Especially preferred is the use of an internal release agent comprising organopolysiloxanes of the general formula:

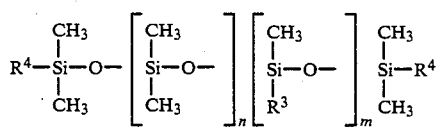

in which
$R^4$ is a methyl radical or the $R^3$ radical,
$n = 10$ to 300,
$m = 1$ to 20, and
$R^3$ is a polar radical.

Due to the methylpolysiloxane structure, the release agent exhibits a surfactant character and accumulates at the interfaces, and, by so doing, becomes effective. Due to the polar $R^3$ radical, the release agent gains a certain compatibility with the resin matrix, which is necessary in order to ensure incorporation in the matrix.

Examples of the polar radicals are polyoxyalkylene radicals, amine radicals, as well as radicals with carboxyl groups, sulfonic acid groups or their salts and quaternary ammonium radicals.

Preferably, $R^4$ is the methyl radical. Especially preferred are compounds in which the subscript "n" has a value of 20 to 100 and the subscript "m" as value of 1 to 8.

In a preferred further development of the inventive process, organosiloxanes are used, in which $R^3$ represents the group

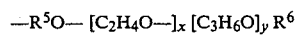

in which
$R^5$ is a bivalent hydrocarbon radical with 2 to 4 carbon atoms,
$R^6$ is a hydrogen, acyl, carbamate or alkyl radical with 1 to 4 carbon atoms,
$n = 10$ to 200,
$m = 1$ to 10, and
x and y are selected such that the average molecular weight of the polyoxyalkylene block is 200 to 2,000 and this block has up to 50 weight percent of oxyethylene groups, the terminal oxyalkylene group being an oxypropylene group
when $R^6$ is a hydrogen atom.

Preferably, $R^5$ is the $-(CH_2)_3-$radical. $R^6$ preferably is hydrogen radical. The average molecular weight of polyoxyalkylene block preferably is 200 to 1,000, especially 400 to 700. Polyoxyalkylene blocks with 10 to 30 weight percent of oxyethylene units are preferred. In the event that $R^6$ is a hydrogen radical, the terminal oxyalkylene group should be an oxypropylene group, so that a reaction with the isocyanate is retarded as much as possible and/or can take place to only a subordinate degree. The oxypropylene and oxyethylene groups may be arranged at random or in blocks in the polyoxyalkylene block.

The values of "x" and "y" arise out of the average molecular weight and the content of oxyethylene units. From this, the values of "x" are calculated to be 1 to 23 and those of "y" 2 to 35.

The modified organopolysiloxanes can be synthesized by reacting organopolysiloxanes in which the $R^3$ radical is a hydrogen radical, with polyoxyalkylene ethers of the formula $$CH_2=CH-(CH_2)_p-O[C_2H_4O]_x[C_3H_6O]_yR^6,$$

in which p=1 or 2, in the presence of platinum catalysts, according to the following example:

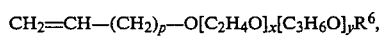

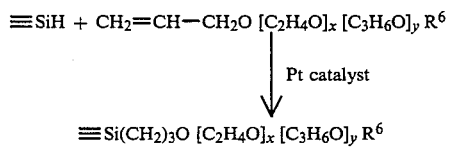

Such reactions are described in German Pat. Nos. 31 33 869 and 32 15 317.

A further preferred development of the inventive process is the use of organopolysiloxanes in which $R^3$ represents the group $$-R^5OCH_2\underset{\underset{OH}{|}}{C}HCH_2N\diagdown_{R^8}^{R^7}$$

in which
R$^5$ has the meaning already given, and
R$^7$ and
R$^8$ and univalent hydrocarbon radicals, alkyloxyalkyl radicals or a common component of a morpholine or piperazine ring.

R$^5$ has the above-mentioned meaning and preferably is the —(CH$_2$)$_3$-radical. R$^7$ and R$^8$ may be the same or different and, preferably, are alkyl radicals with 1 to 10 carbon atoms, such as, methyl, ethyl, propyl, isobutyl, cyclohexyl or decyl radicals. The R$^7$ and R$^8$ radicals may also be alkyloxyalkyl radicals, for example, —CH$_2$CH$_2$OCH$_3$ radicals. A cyclic radical may take the place of the two radicals. In this connection, the R$^7$, R$^8$ radicals are a common component of a morpholine or piperazine ring, for example:

—N⌒O  or  —N⌒N—CH$_3$.

Especially preferred R$^3$ radicals are radicals of the formula

—(CH$_2$)$_3$—OCH$_2$$\underset{\underset{OH}{|}}{C}$HCH$_2$N(C$_2$H$_5$)$_2$,

—(CH$_2$)$_3$—OCH$_2$$\underset{\underset{OH}{|}}{C}$HCH$_2$N$\diagdown_{C_6H_5}^{CH_3}$, —(CH$_2$)$_3$—OCH$_2$$\underset{\underset{OH}{|}}{C}$HCH$_2$N⌒O, —(CH$_2$)$_3$—OCH$_2$$\underset{\underset{OH}{|}}{C}$HCH$_2$N⌒N—CH$_3$, —(CH$_2$)$_3$—OCH$_2$$\underset{\underset{OH}{|}}{C}$HCH$_2$N(CH$_2$CH$_2$OCH$_3$)$_2$.

The synthesis of these siloxanes can be accomplished by allowing polysiloxanes, which have hydrogen radicals as R$^3$ radicals, to react with allyl glycidyl ethers and then with amines of the formula:

HN$\diagdown_{R^8}^{R^7}$

This synthesis also proceeds in a known manner.

Finally, a further preferred development of the process of the present invention is the use of organopolysiloxanes in which the R$^3$ group is the group $$-R^5OCH_2\underset{\underset{OH}{|}}{C}HCH_2(OC_2H_4)_zOR^9$$

in which
R$^5$ has the meaning given above,
R$^9$ is an alkyl radical with 1 to 4 carbon atoms, and
z=1 to 10.
Preferably, R$^9$ is a methyl or butyl radical.

The compounds can be synthesized similarly to the aforementioned compounds by reacting hydrogenpolysiloxanes with allyl glycidyl ethers and, subsequently, with a polyether monool of the formula H[OC$_2$H$_4$]$_z$OR$^9$.

These internal release agents are added to the lignocellulose-containing materials in amounts of from 0.5 to 5 weight percent, based on the polyisocyanate. They may optionally be added in dissolved form.

As polyisocyanates, conventional isocyanates known for such processes from the state of the art are used, such as, for example, bivalent and multivalent, aliphatic, cycloaliphatic, and, preferably, aromatic isocyanates or their partial reaction products with polyols (so-called prepolymers). Suitable polyisocyanates are listed in German Pat. No. 23 25 926.

The lignocellulose-containing material used may include comminuted wood in the form of flour and chips, straw, flax, sisal, hemp, sugar cane bagasse, and peanut or rice shells and cork, which can be pressed into panels or molded objects.

The following examples illustrate the invention.

EXAMPLE 1

PRODUCTION OF CHIPBOARDS (a) Coating the Cauls:
The cauls are sprayed with a solution of the following composition:

|  | Parts by Weight |
|---|---|
| alkoxypolysiloxoane | 4.7 |
| (OC$_2$H$_5$)$_{0.75}$<br>\|<br>(CH$_3$)$_{1.5}$SiO$_{0.88}$ | |
| α,ω-polysiloxanediol<br>molecular weight: 5,700 | 4.3 |
| silicate ester<br>(C$_2$H$_5$O)$_{2.4}$SiO$_{0.8}$ | 1.0 |
| catalyst<br>p-toluenesulfonic acid | 0.2 |
| solvent naphtha, B.P. range 140–190° C. | 10.0 |
| solvent naphtha, B.P. range 80–110° C. | 5.0 |
| 1,1,1-trichloroethane | 10.0 |
| monofluorotrichloromethane | 63.0 |

After a thin, coherent film is formed, the caul is heated for 30 seconds to about 140° C. A solid, lacquer-like coating results.

For comparison with release agents of the state of the art, the cauls are sprayed with a solution of 4 g of sodium oleate in 96 g water (comparison product 1) or a 4 weight percent microwax/paraffin dispersion, which contains 16.0 weight percent solvent naphtha (boiling point range 140° to 190° C.) and 80.0 weight percent of 1,1,1-trichloroethane as external phase (comparison product 2) and the solvent is evaporated.

(b) Internal Release Agent

A polysiloxane block copolymer of the following formula

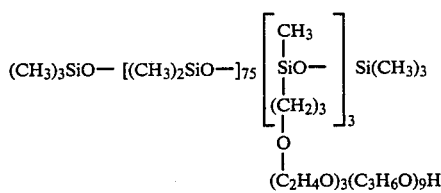

is added to the polyisocyanate in amounts of 3 weight percent.

(c) Preparation of Chipboards

In a frame construction, a chip "cake" is first prepared. For this purpose, 200 g of beech chips with a residual moisture content of 11.5%, together with 12 g of crude 4,4'-diphenylmethane diisocyanate with an NCO content of 31.2 weight percent, are mixed well in a laboratory mixer. In those cases where an internal release agent is used in the experiments, this release agent is previously added to the isocyanate. This mixture is spread onto a caul, which is provided with the release agent to be tested and which carries the frame construction, and consolidated with a stamper into a chip "cake". The frame is now removed and the upper side of the chip "cake" is covered with a similarly coated caul.

The chip "cake" covered by the two cauls is now placed in a hot press and pressed for 8 minutes at a pressure of 18 kp/cm$^2$ and a temperature of 180° C. The press in then opened and the pressed package removed. The upper and lower cauls are now pulled off and the release behavior and the surface of the cauls with respect to their contamination are evaluated. A chip "cake" is built up once more and a pressing is carried out without coating the cauls again. The number of pressing processes for which good release is possible is determined.

The results are summarized in Table I.

TABLE I

| Experiment | Coating | Internal Release Agent | Number of Satisfactory Releases | Appearance of the Cauls |
|---|---|---|---|---|
| 1 | according to Example 1 (a) | none | 5 | no residue formed |
| 2 | according to Example 1 (a) | according to Example 1 (b) | 13 | no residue formed |
| 3 | comparison product 1 | none | 1 | the surface of the cauls shows residues at some places |
| 4 | comparison product 2 | none | 1 | heavy residue formed |

The experiments show that the cauls coated in accordance with the inventive process allow a larger number of pressings to be carried out without adhesion or the formation of residues, than do the products of the state of the art. The results furthermore show that by using the internal release agent in accordance with the invention, the release properties can be improved even further by a factor of 3 or 4. Consequently, the inventive process significantly improves the industrial production of isocyanate-bonded chipboards and a more rational manufacturing process becomes possible.

EXAMPLE 2

PRODUCTION OF CORK PANELS (a) Coating the Cauls:

The cauls are sprayed with a solution of the following composition:

| | Parts by Weight |
|---|---|
| alkoxypolysiloxane (OC$_2$H$_5$)$_{0.8}$ (CH$_3$)$_{1.3}$SiO$_{0.95}$ | 6.0 |
| α,ω-polysiloxanediol molecular weight: 6,500 | 3.0 |
| silicate ester (C$_2$H$_5$O)$_{2.4}$SiO$_{0.8}$ | 1.0 |
| catalyst p-toluenesulfonic acid | 0.2 |
| solvent naphtha, B.P. range 140–190° C. | 10.0 |
| solvent naphtha, B.P. range 80–110° C. | 5.0 |
| 1,1,1-trichloroethane | 10.0 |
| monofluorotrichloromethane | 63.0 |

After a thin, coherent film is formed, the caul is heated for 30 seconds to about 140° C. A solid, lacquer-like coating results.

(b) Internal Release Agent

A polysiloxane block copolymer of the following formula

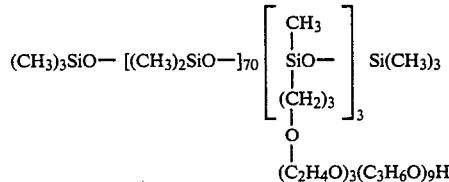

is added to the polyisocyanate in amounts of 3 weight percent.

(c) Preparation of the Cork Panels

In a frame construction, a pile of 100 g of cork granulate with a residual moisture content of 10%, together with 24 g of an isocyanate prepolymer with 4.5 weight percent of NCO-groups is mixed well in a laboratory mixer. In those cases where an internal release agent is used in the experiments, this release agent is previously added to the isocyanate. This mixture is spread onto a caul, which is provided with the release agent to be tested and which carries the frame construction, and consolidated with a stamper into a granulate "cake". The frame is now removed and the upper side of the granulate "cake" is covered with a similarly coated caul.

The cork granulate "cake" covered by the two cauls is now placed in a hot press and pressed for 6 minutes at a pressure of 8 kp/cm$^2$ and a temperature of 140° C. The press is then opened and the pressed package removed.

The upper and lower cauls are now pulled off and the release behavior and the surface of the cauls with respect to contamination are evaluated. A cork "cake" is built up once more now and a pressing is carried out without again coating the cauls. The number of pressing processes for which good release is possible, is determined. The results are summarized in Table II.

TABLE II

| Experiment | Coating | Internal Release Agent | Number of Satisfactory Releases | Appearance of the Cauls |
|---|---|---|---|---|
| 1 | according to Example 2 (a) | none | 4 | no residue formed |
| 2 | according to Example 2 (a) | according to Example 2 (b) | 14 | no residue formed |
| 3 | comparison product 1 | none | 2 | the surface of the cauls shows residues at some places |
| 4 | comparison product 2 | none | 1 | heavy residue formed |

EXAMPLE 3

PREPARATION OF CHIPBOARDS (a) Coating the Cauls:
as in Example 1 (a)
(b) Internal Release Agent:
A polysiloxane block copolymer of the following formula

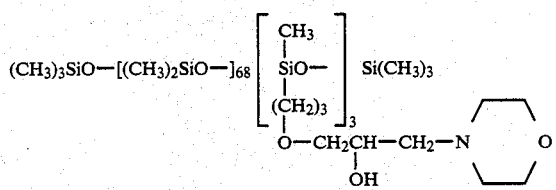

is added to the polyisocyanate in amounts of 2.5 percent by weight.

(c) Preparation of the Chipboards: as in Example 1 (c)
The results are summarized in Table III.

TABLE III

| Experiment | Coating | Internal Release Agent | Number of Satisfactory Releases | Appearance of the Cauls |
|---|---|---|---|---|
| 1 | according to Example 1 (a) | none | 5 | no residue formed |
| 2 | according to Example 1 (a) | according to Example 3 (b) | 16 | no residue formed |
| 3 | comparison product 1 | none | 2 | the surface of the cauls shows residues at some places |
| 4 | comparison product 2 | none | 1 | heavy residue formed |

EXAMPLE 4

PREPARATION OF CORK PANELS (a) Coating the Cauls:
as in Example 2 (a)
(b) Internal Release Agent:
A polysiloxane block copolymer of the formula

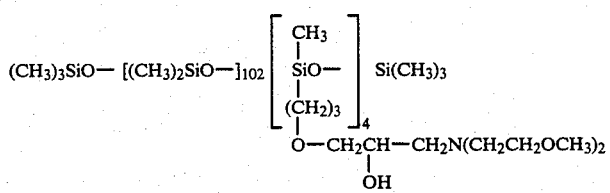

is added in amounts of 4% by weight to the isocyanate prepolymer (NCO content 4.5%).
(c) Preparation of the Cork Panels:
as in Example 2 (c).
The results are summarized in Table IV.

TABLE IV

| Experiment | Coating | Internal Release Agent | Number of Satisfactory Releases | Appearance of the Cauls |
|---|---|---|---|---|
| 1 | according to Example 2 (a) | none | 5 | no residue formed |
| 2 | according to Example 2 (a) | according to Example 4 (b) | 16 | no residue formed |
| 3 | comparison product 1 | none | 2 | the surface of the cauls shows residues at some places |
| 4 | comparison product 2 | none | 1 | heavy residue formed |

EXAMPLE 5

PREPARATION OF CORK PANELS (a) Coating the Cauls
as in Example 1 (a)
(b) Internal Release Agent:
Polysiloxane block copolymers of the following formula (b1)

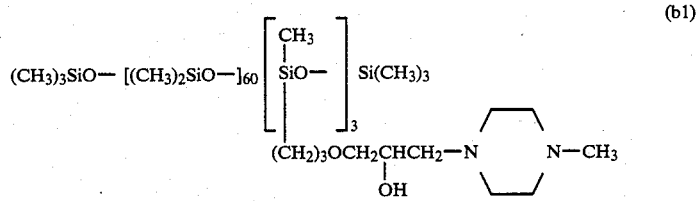

-continued

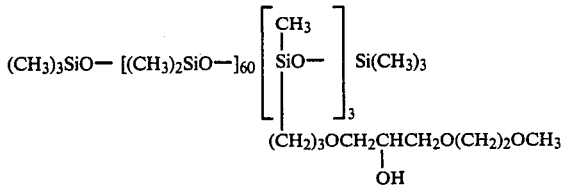

are added in each case in amounts of 1.5% by weight of the NCO-group-containing prepolymer as in Example 2.

(c) Preparation of the Cork Panels as in Example 2 (c) The results are summarized in Table V.

TABLE V

| Experiment | Coating | Internal Release Agent | Number of Satisfactory Releases | Appearance of the Cauls |
|---|---|---|---|---|
| 1 | according to Example 1 (a) | none | 5 | no residue formed |
| 2 | according to Example 1 (a) | according to Example 5 (b1) | 16 | no residue formed |
| 3 | according to Example 1 (a) | according to Example 5 (b2) | 15 | no residue formed |
| 4 | comparison product 1 | none | 2 | the surface of the cauls shows residues at some places |
| 5 | comparison product 2 | none | 1 | heavy residue formed |

EXAMPLE 6

PREPARATION OF CHIPBOARDS (a) Coating the Cauls:
as in Example 1 (a), however, using equal amounts of dibutyl tin dilaurate as catalyst.

(b) Internal Release Agent:
A polysiloxane block copolymer of the following formula

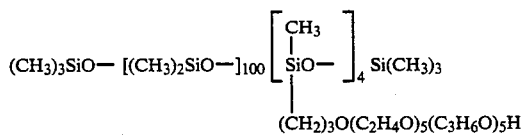

is added to the polyisocyanate in amounts of 2.0% by weight.

(c) Preparation of the Chipboards as in Example 1 (c). The results are summarized in Table VI.

TABLE VI

| Experiment | Coating | Internal Release Agent | Number of Satisfactory Releases | Appearance of the Cauls |
|---|---|---|---|---|
| 1 | according to Example 6 (a) | none | 5 | no residue formed |
| 2 | according to Example 6 (a) | according to Example 6 (b) | 10 | no residue fomed |
| 3 | comparison product 1 | none | 2 | the surface of the cauls shows residues at some places |
| 4 | comparison product 2 | none | 1 | some places heavy residue formed |

We claim:

1. In a process for the manufacture of molded objects wherein lignocellulose-containing materials with polyisocyanates as a binder are subjected to hot pressing in a caul or mold and wherein an agent is applied to the surface of the caul or mold to facilitate release of the molded article from the press, the improvement which comprises using as the release agent a mixture comprising (a) 20 to 65 weight percent of a silicone resin of the general formula $$(CH_3)_a - SiO_{\frac{4-(a+b)}{2}}^{(OR^1)_b}$$

in which
$R^1$ is a low molecular weight alkyl radical with 1 to 4 carbon atoms,
a has a value of 1 to 1.7,
b has a value of 0.3 to 1.0;

(b) 30 to 65 weight percent of an $\alpha,\omega$-methylsiloxanediol with an average molecular weight of 1,000 to 20,000;

(c) 5 to 15 weight percent of a silicate ester of the general formula $$(R^2O)_c SiO_{\frac{4-c}{2}}$$

in which
$R^2$ is a low molecular weight hydrocarbon radical with 2 to 4 carbon atoms,
c has a value of 2.1 to 4.0;

wherein the sum of components (a), (b), and (c) amounts to 100, and after applying the mixture to the surface of the caul or mold, subjecting the mixture to curing at temperatures from 100° C. to 200° C.

2. The process of claim 1 wherein the curing is carried out in the presence of a curing catalyst.

3. The process of claim 1 wherein the lignocellulose-containing material is admixed with an internal release agent prior to pressing, the amount of the internal release agent being from 1 to 5 percent by weight based on the isocyanate.

4. The process of claim 3, wherein the internal release agent is an organopolysiloxane having the general formula

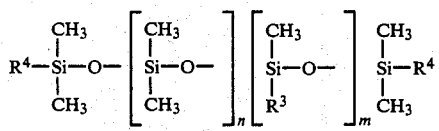

in which

R[4] is a methyl radical or the R[3] radical, n=10 to 300, m=1 to 20, and

R[3] is a polar radical.

5. The process of claim 4 wherein R[3] represents the group

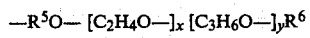

in which

R[5] is a bivalent hydrocarbon radical with 2 to 4 carbon atoms,

R[6] is a hydrogen, acyl, carbamate or alkyl radical with 1 to 4 carbon atoms, n=10 to 200, m=1 to 10, and x and y are selected such that the average molecular weight of the polyoxyalkylene block is 200 to 2,000 and this block has up to 50 weight percent of oxyethylene groups, the terminal oxyalkylene group being an oxypropylene group when R[6] is a hydrogen atom.

6. The process of claim 4 wherein R[3] represents the group

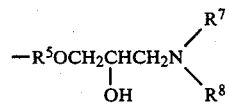

in which

R[5] is a bivalent hydrocarbon radical with 2 to 4 carbon atoms,

R[7] and

R[8] are univalent hydrocarbon radicals, alkyloxyalkyl radicals or a common component of a morpholine or piperazine ring.

7. The process of claim 4 wherein R[3] represents the group

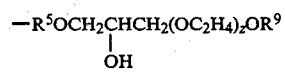

in which

R[5] is a bivalent hydrocarbon radical with 2 to 4 carbon atoms,

R[9] is an alkyl radical with 1 to 4 carbon atoms, and z=1 to 10.

8. The process of claim 1, 2, or 3 wherein R[1] is selected from the group consisting of ethyl, methyl, propyl, butyl, branched propyl and branched butyl.

9. The process of claim 1, 2, or 3 wherein a is 1 to 1.5.

10. The process of claim 1, 2, or 3 wherein b is 0.5 to 0.8.

11. The process of claim 1, 2, or 3 wherein the molecular weight of component (b) is from 3,000 to 10,000.

12. The process of claim 1, 2, or 3 wherein R[2] is selected from the group consisting of ethyl, propyl, branched propyl and butyl.

13. The process of claim 1 wherein the silicate ester is polymeric.

* * * * *